(12) United States Patent
Kaeser et al.

(10) Patent No.: US 10,906,741 B2
(45) Date of Patent: Feb. 2, 2021

(54) CONVEYING DEVICE WITH TWO CONVEYING CARTS, AND COVERING MEANS FOR COVERING AN INTERSPACE BETWEEN THE TWO CONVEYING CARTS

(71) Applicant: Interroll Holding AG, Sant' Antonino (CH)

(72) Inventors: Uwe Kaeser, Sinsheim (DE); Heinrich Droste, Sinsheim (DE)

(73) Assignee: Interroll Holding AG

( * ) Notice: Subject to any disclaimer, the term of this patent is extended or adjusted under 35 U.S.C. 154(b) by 0 days.

(21) Appl. No.: 16/626,974

(22) PCT Filed: Jun. 21, 2018

(86) PCT No.: PCT/EP2018/066550
§ 371 (c)(1),
(2) Date: Dec. 27, 2019

(87) PCT Pub. No.: WO2019/002079
PCT Pub. Date: Jan. 3, 2019

(65) Prior Publication Data
US 2020/0231387 A1 Jul. 23, 2020

(30) Foreign Application Priority Data
Jun. 30, 2017 (DE) .......................... 10 2017 006 213

(51) Int. Cl.
*B65G 21/16* (2006.01)
*B65G 47/54* (2006.01)
(Continued)

(52) U.S. Cl.
CPC ................ *B65G 21/16* (2013.01); *B07C 5/36* (2013.01); *B65G 21/2045* (2013.01); *B65G 47/54* (2013.01)

(58) Field of Classification Search
None
See application file for complete search history.

(56) References Cited

U.S. PATENT DOCUMENTS

| 6,360,868 B1 | 3/2002 | Arlt et al. |
| 6,478,138 B1 | 11/2002 | Edwards et al. |
| (Continued) | | |

FOREIGN PATENT DOCUMENTS

| DE | 199 14 386 | 10/2000 |
| EP | 1 041 019 | 10/2000 |
| (Continued) | | |

OTHER PUBLICATIONS

German Office Action dated May 7, 2018.
International Search Report dated Oct. 30, 2018.

*Primary Examiner* — Kavel Singh
(74) *Attorney, Agent, or Firm* — Gerald E. Hespos; Michael J. Porco; Matthew T. Hespos

(57) ABSTRACT

A conveying device (1) has conveying carts (2) arranged one behind another and spaced apart by an interspace (4). One conveying cart (2) has a cover (6) and another has a cross-belt conveyor (8) for conveying material transverse to the conveying direction. The cover (6) covers the interspace (4) between the conveying carts (2) so that the cover (6) of the one conveying cart (2) is under the upper run (21) of the transverse belt (10) of the other conveying cart (2). When negotiating curves, the cover (6) engages between an underside (22) of the upper run (21) and a first support plane (20) to hinder the transverse belt (10) from moving in the transverse conveying direction. When travelling straight ahead the cover (6) engages between the first support plane (20) and a second support plane (24) to permit movement of the transverse belt (10) in the transverse conveying direction.

12 Claims, 3 Drawing Sheets

(51) Int. Cl.
  *B65G 17/32*    (2006.01)
  *B07C 5/36*     (2006.01)
  *B65G 21/20*    (2006.01)

(56) References Cited

U.S. PATENT DOCUMENTS

| | | | |
|---|---|---|---|
| 6,607,066 | B1 | 8/2003 | Andersen et al. |
| 6,820,561 | B2* | 11/2004 | Soldavini ............... B65G 47/96 104/88.04 |
| 6,938,750 | B2* | 9/2005 | Miller .................. B65G 17/345 198/370.04 |
| 9,233,803 | B2* | 1/2016 | Pilarz ..................... B65G 17/42 |
| 9,493,308 | B2* | 11/2016 | Hoynash ................... B07C 5/04 |
| 2003/0221935 | A1* | 12/2003 | Barklin .................. B65G 47/96 198/357 |
| 2013/0019773 | A1 | 1/2013 | Rosenwinkel et al. |
| 2016/0257501 | A1 | 9/2016 | Chierego et al. |
| 2017/0029215 | A1 | 2/2017 | Parodi et al. |

FOREIGN PATENT DOCUMENTS

| | | |
|---|---|---|
| EP | 3 159 288 | 4/2017 |
| FR | 3 011 537 | 4/2015 |

\* cited by examiner

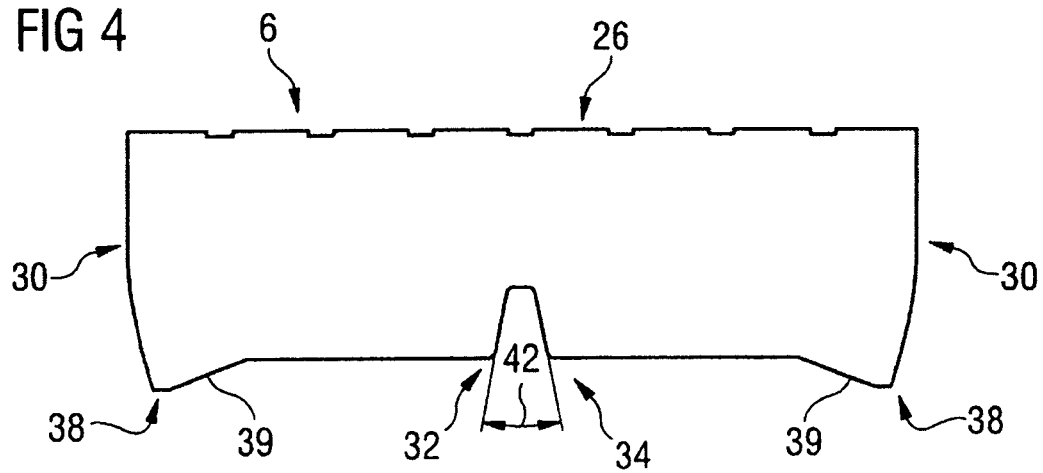
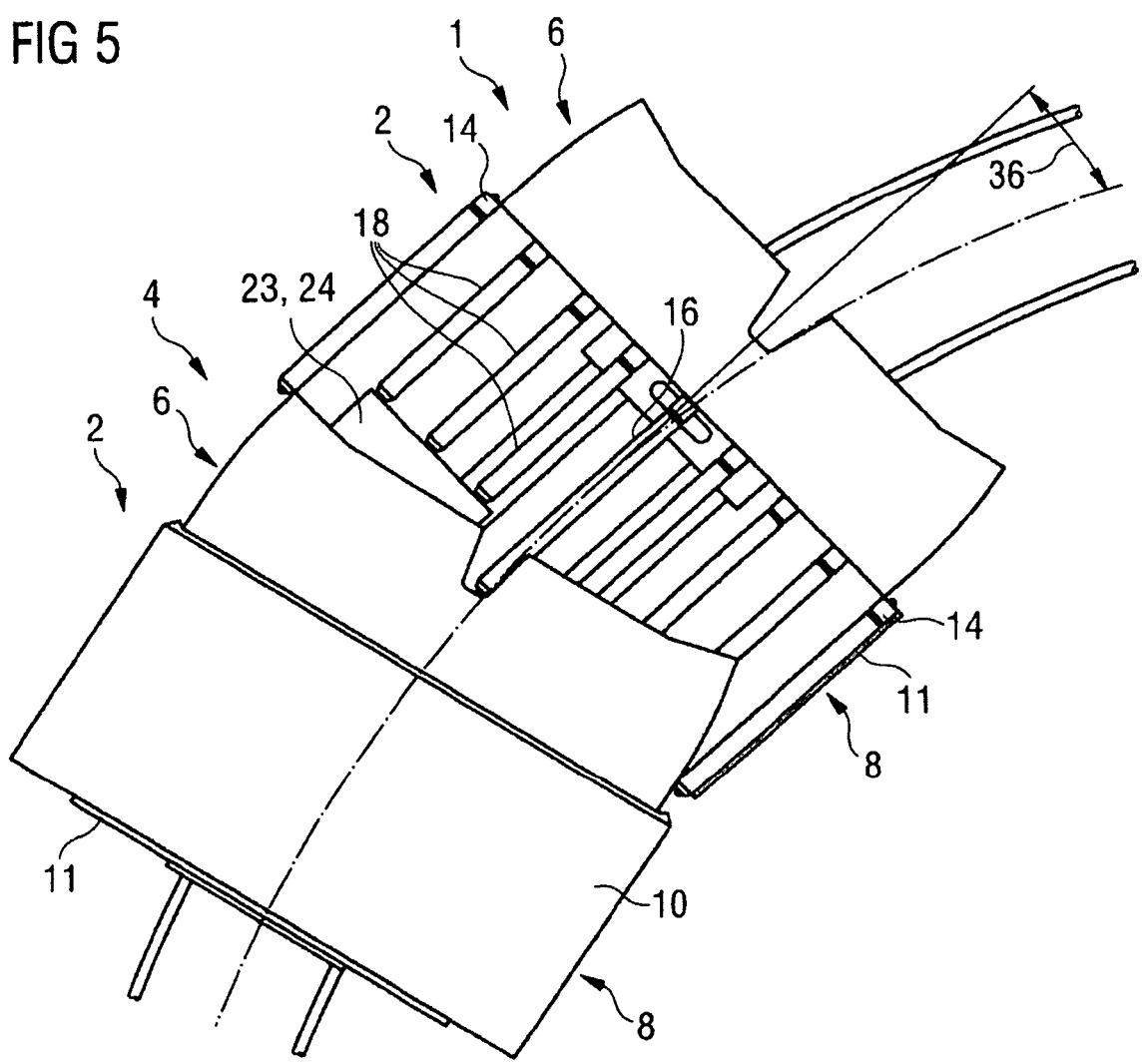

CONVEYING DEVICE WITH TWO CONVEYING CARTS, AND COVERING MEANS FOR COVERING AN INTERSPACE BETWEEN THE TWO CONVEYING CARTS

BACKGROUND

Field of the Invention

The invention relates to a conveying device with at least two conveying carts, and to a covering means for covering an interspace between the two conveying carts.

Related Art

A known conveying device has at least two conveying carts. The conveying carts are equipped with a conveyor belt that is arranged and can be driven transversely to the conveying direction. The conveying carts preferably are used as revolving chains of carts in transverse-belt sorters (crossbelt sorters) to receive and convey piece goods for high-performance distribution in mail processing and distribution centers. A conventional conveying device has two known conveying carts arranged one behind the other in the conveying direction and spaced apart from each other such that an interspace is formed between the two conveying carts. It is customary to provide a covering means for covering the interspace. This covering means is intended to prevent conveyed material from falling off a conveying cart and through the interspace. Thus, the covering means is intended to prevent damage to the conveyed material, the conveying cart and/or the conveying device. The conventional covering means for a conveying cart equipped with a cross-belt conveyor in the conveying device have not sufficiently taken into account the particular demands made by this configuration in terms of virtually complete covering of the interspace while allowing reliable operation of the cross-belt conveyor. These insufficiencies occur, for example, in the case of the conveying carts negotiating horizontal curves and a cross-belt conveyor with a transverse belt that is supported by track rollers. Further, when negotiating curves there is the risk of the transverse belt moving unintentionally due to the weight of the conveyed material that is stored thereon, so that the conveyed material falls off the conveying cart.

In particular, the known embodiments have the disadvantage that the covering means when travelling straight ahead rests between the track rollers and the transverse belt, and as a result the transverse belt rubs across the covering means during conveying of the conveyed material. Particularly in the case of heavy items of conveyed material, high frictional forces may arise, and despite the track rollers low-wear rolling friction relative to the transverse belt does not occur.

Given this background, it is an object of the invention to make available a conveying device with at least two conveying carts, and a covering means for covering an interspace between the two conveying carts, wherein complete covering of the interspace while allowing reliable operation of the cross-belt conveyor is improved and there is no longer the risk that conveyed material will fall off the conveying cart when negotiating curves.

SUMMARY

One aspect relates to a conveying device with at least two conveying carts that are arranged one behind the other in the conveying direction and are spaced apart from each other such that an interspace is formed between the two conveying carts. At least the one conveying cart has a covering means and at least the other conveying cart has a cross-belt conveyor for conveying conveyed material in a transverse conveying direction oriented substantially transversely to the conveying direction. The covering means, when the conveying carts are travelling straight ahead and when they are negotiating curves, covers the interspace between the conveying carts in that the covering means of the one conveying cart is arranged at least in portions under the upper run of the transverse belt of the other conveying cart. Thus, when negotiating curves the covering means engages at least in portions between an underside of the upper run and a first support plane to hinder the transverse belt from moving in the transverse conveying direction, and, when travelling straight ahead, the covering engages at least in portions between the first support plane and a second support plane to permit the movement of the transverse belt in the transverse conveying direction. The first support plane and the second support plane in this case are spaced apart from each other.

One advantage of this aspect is that, on the one hand, effective covering of the interspace between the conveying carts is achieved. On the other hand, there is also no longer the risk that a conveyed material on the conveying cart with the cross-belt conveyor will drive the transverse belt by the centrifugal force acting on the conveyed material when negotiating horizontal curves and thus will unintentionally be carried to the outside of the curve and possibly fall off the conveying cart.

One further advantage of this aspect is that, when travelling straight ahead, the covering means does not hinder reliable operation of the cross-belt conveyor is thus ensured.

The aforementioned advantages become particularly noticeable in the case of a transverse belt which, as is nowadays conventional, is used in a particularly low-friction manner and is therefore energy-saving. For example, a transverse belt that is tensioned by a tensioning means does not run in a low-friction manner, but a transverse belt that is guided by a wedge profile strip does. The wedge profile strip may in this case be arranged on the inner side of the transverse belt and be guided laterally by way of corresponding grooves in the cylinder rollers.

With a transverse belt that is used in low-friction manner in this way, there is an increased risk that a conveyed material on the conveying cart with the cross-belt conveyor will drive the transverse belt by the centrifugal force acting on the conveyed material when negotiating horizontal curves and thus will unintentionally be carried to the outside of the curve and may possibly fall off the conveying cart.

In order to save energy and to reduce wear, the covering means should no longer block the rotation of the track rollers when travelling straight ahead under the action of the weight of the conveyed material. Rather, there should be rolling friction between the transverse belt and the track rollers, and sliding friction at most in the region of the covering means, if contact between the transverse belt and covering occurs due to the weight of the conveyed material. Furthermore, in this case, however, the interspace should be covered completely and when negotiating curves the transverse belt should nevertheless be secured against unintentional movement by the conveyed material that is supported thereon.

The conveying device may have one or more conveying carts for transporting conveyed material in a conveying direction. The conveying device may be formed as a conveying device revolving in a horizontal plane or a conveying device revolving in a vertical plane. The conveying device may, over the course of its transport path, include horizontal curve paths and/or vertical curve paths that deviates from a straight line, i.e. uphill and downhill passages.

The conveying cart of the conveying device may have a conveying surface formed substantially perpendicularly to a direction of gravity. The conveyed material can be deposited on the conveying surface owing to the gravitational force acting on the conveyed material, and thus the conveyed material can be transported by means of the conveying cart. The conveying cart may have a cross-belt conveyor for conveying conveyed material in a direction transverse to the conveying direction of the conveying device.

The cross-belt conveyor may be provided for diverting conveyed material in a transverse conveying direction transverse to the conveying direction of the conveying device, with the transverse belt of the cross-belt conveyor being able to be driven in the transverse conveying direction that is desired in each case.

The covering means for covering the interspace between two conveying carts may be formed from a material and/or with a configuration that is sufficiently rigid that the interspace can be bridged reliably, but also is sufficiently flexible that a vertical deviation in position between the conveying carts can be compensated for.

The upper run of the transverse belt in the context of the present invention is the upper part of the transverse belt between the deflecting rollers of the transverse belt, i.e. that part of the transverse belt on which a conveyed material that is to be transported rests. The upper run may rest on idlers and/or track rollers between the deflecting rollers.

Idlers or track rollers may be rotatably mounted cylinder rollers arranged between the deflecting rollers, and the upper run of the transverse belt may be supported on the cylinder rollers. A transverse belt tensioned between the deflecting rollers may, for example, be guided by a crowned embodiment of the deflecting rollers. Below, to simplify matters, only the term "track roller" will be used for all the rollers.

The first support plane may be a flat surface on which the underside of the upper run of the transverse belt rests when the transverse belt is at rest or being driven. Alternatively or additionally, the first support plane may be a virtual plane that includes linear and/or planar contact regions on which the underside of the upper run of the transverse belt rests when the transverse belt is at rest or being driven.

The second support plane may be a flat surface on which the covering means rests, at least in portions, in particular when the conveying carts are travelling straight ahead. Alternatively or additionally, the second support plane may be a virtual plane that includes linear and/or planar contact regions on which the covering means rests at least in portions, in particular when the conveying carts are travelling straight ahead.

When negotiating curves, the underside of the upper run of the transverse belt may rest at least in part on the first support plane and at least in part on the covering means of the other conveying cart. In this case, the covering means may rest with its underside at least in part on the first support plane and at least in part on the second support surface.

The terms "at the back" or "behind" and the like used below, in the context of the present invention, mean a direction counter to the conveying direction of the conveying device and/or a position of an element relative to another element in relation to the conveying direction. The terms "at the front" or "in front of" and the like used below, in the context of the present invention, mean a direction in the conveying direction of the conveying device and/or a position of an element relative to another element in relation to the conveying direction.

The terms "at the top" or "above" and the like used below, in the context of the present invention, mean a direction counter to the direction of gravity and/or a position of an element relative to another element in relation to the direction of gravity. The terms "at the bottom" or "beneath" and the like used below, in the context of the present invention, mean a direction in the direction of gravity and/or a position of an element relative to another element in relation to the direction of gravity.

The terms "outside" or "inside" and the like used below, in the context of the present invention, mean that an idealized or virtual midpoint is an innermost point. An outer region in relation thereto is an idealized or virtual peripheral region. A point or region that is referred to as being located farther to the outside than another point or region therefore rests in the radial direction, starting from the midpoint, farther away in the direction of the peripheral region than the other point or region.

Relative movements between the covering means on the one conveying cart and the other conveying cart will be considered and described below as if the covering means is moving in relation to the other conveying cart, even if the conveying cart is moving in relation to the covering means.

Advantageously, when the conveying carts are negotiating curves, a free end portion of the covering means, viewed from above, can pivot into a gap between two track rollers of the cross-belt conveyor and can be raised, at least in portions, from the second support plane into the first support plane. Thus, the free end portion of the covering means pushes itself onto the upper side of that one of the two track rollers that is arranged farther to the outside of the curve into a position, in particular into a braking position of at least a portion of the covering means. As a result, the covering means engages, at least in portions, between the underside of the upper run of the transverse belt and the first support plane on the track roller that is external to the curve, thereby hindering the transverse belt from moving in the transverse conveying direction, i.e. braking the transverse belt.

Thus when negotiating curves engagement of the covering means under the upper run of the transverse belt is facilitated.

In other words, the covering means in the braking position is pivoted or pushed, at least in portions, between the upper run of the transverse belt and at least one of the track rollers, and so to speak wedges in this manner between the upper run of the transverse belt and at least one of the track rollers. This effect occurs due to the belt tension of the transverse belt, and this tension generates a normal force on the covering means. This normal force, in conjunction with a coefficient of friction, advantageously designed beneficially therefor, for static friction between the underside of the upper run of the transverse belt and the covering means, ensures braking or holding in position of the transverse belt, and thus prevents movement in the transverse conveying direction.

Alternatively or additionally, when the conveying carts are negotiating curves a lateral end portion of the covering means, which is on the outside of the curve when viewed from above, can pivot into a gap between an inner track roller and that deflecting roller of the cross-belt conveyor that is external to the curve. In particular, the lateral end portion, which is on the outside of the curve, may in this case be raised, at least in portions, from the second support plane into the first support plane. Thus, this lateral end portion pushes itself onto the upper side of that deflecting roller that is external to the curve and into a position, in particular into a braking position of at least a portion of the covering means, in which the covering means engages, at least in portions, between the underside of the upper run of the transverse belt and the first support plane on that deflecting roller that is external to the curve, thereby hindering the transverse belt from moving in the transverse conveying direction, i.e. braking the transverse belt.

In other words, the covering means in the braking position is pivoted or pushed, at least in portions, between the upper run of the transverse belt and that deflecting roller that is external to the curve, and so to speak wedges in this manner between the upper run of the transverse belt and that deflecting roller that is external to the curve; this generates a belt tension of the transverse belt in the radial direction of the deflecting roller towards the outside. This partial belt tension prevents the transverse belt from revolving on the deflecting roller, thus hinders the transverse belt from moving in the transverse conveying direction, and ensures braking or holding in position of the transverse belt.

In particular, when pivoting the free end portion into a gap between two track rollers, a peripheral edge of the free end portion can slide along an upper periphery of that one of the two track rollers that is arranged farther to the outside of the curve, or the peripheral edge of the free end portion is guided by the rounded-off upper part of that track roller that is arranged farther to the outside of the curve, upon pivoting the free end portion into the braking position. Thus the free end portion can enter in a simple manner into the braking or holding position and the engaging of the covering means under the upper run is further facilitated.

Advantageously, when the conveying carts are travelling straight ahead, the covering means in the region of the conveying cart with the cross-belt conveyor can rest on the second support plane, in particular in a support position of the covering means. Thus, movement of the transverse belt is permitted, and reliable operation of the cross-belt conveyor is ensured.

In particular when the conveying carts are travelling straight ahead, the covering means in the region of the conveying cart with the cross-belt conveyor can rest exclusively on the second support plane.

Advantageously, the first support plane may be oriented substantially parallel to the second support plane. This parallel orientation prevents crossing of the support planes, which otherwise might result in overlapping of the braking position and the support position, i.e. of the regions of preventing and permitting the movement of the transverse belt. Overlapping of these positions could however prevent the desired movement of the transverse belt when travelling straight ahead and/or could permit the undesirable movement of the transverse belt when negotiating curves.

Advantageously, the first and the second support plane may be spaced apart from each other approximately perpendicularly to their direction of extent. This further contributes to avoiding overlapping of the braking position and the support position.

In particular, the second support plane may be formed beneath the first support plane. This further ensures that in the support position the desired movement of the transverse belt when travelling straight ahead can be permitted, and the undesirable movement of the transverse belt when negotiating curves can be prevented.

Advantageously, the first support plane may be formed as a conveying plane defined, in each case, by an uppermost barrel line of the track rollers of the cross-belt conveyor, and the second support plane may be formed as a supporting surface that adjoins inner track rollers of the cross-belt conveyor in the axial direction thereof. The inner track rollers are formed between deflecting rollers of the cross-belt conveyor. Thus, the two support planes can be implemented in a simple manner.

The conveying plane and the first support plane may coincide when the conveying carts are travelling straight ahead. Thus, when travelling straight ahead, the second support plane may be formed beneath the conveying plane and the first support plane.

The conveying plane and the first support plane may be spaced apart from each other, for example by the thickness of the covering means when the conveying carts are negotiating curves. Thus when negotiating curves the second support plane may be formed beneath the conveying plane and the first support plane, and the conveying plane may be formed beneath the first support plane.

The deflecting rollers are the outermost track rollers of the cross-belt conveyor.

Advantageously, the inner track rollers and the supporting surface, viewed in the axial direction of the track rollers, may together have an extent of approximately the same size as the axial extent of the deflecting rollers.

In other words, although the inner track rollers may be shorter than the deflecting rollers, this can be compensated for with regard to the length of the deflecting rollers by means of the supporting surface that adjoins in the axial direction thereof. Thus in a simple manner the second support plane can be realized as a supporting surface on which the covering means, at least in portions, is in its support position, without unintentionally coming into contact with track rollers and/or the transverse belt of the cross-belt conveyor. This may further promote reliable operation of the cross-belt conveyor.

Advantageously, a central track roller may be arranged between the deflecting rollers, in particular in the middle between the deflecting rollers, of the cross-belt conveyor. The central track roller may have an axial extent that corresponds to that of the deflecting rollers, with the inner track rollers possibly being formed on both sides of the central track roller. Thus a distance between the deflecting rollers which is otherwise free for the covering means in the region of the supporting surfaces can be reduced, and supporting of the upper run can thereby be improved. Guidance of the transverse belt can also thus be improved, because the transverse belt thereby has support over its entire width in the middle.

For example, the central track roller may be mounted resiliently in order to form an elastic force-induced countersurface for a friction-wheel roller that drives the transverse belt.

One further aspect relates to a covering means for covering an interspace between two conveying carts of a conveying device. The conveying carts are arranged one behind the other in a conveying direction and are spaced apart from each other. At least the one conveying cart has the covering means and at least the other conveying cart has a cross-belt conveyor for conveying conveyed material in a transverse conveying direction oriented substantially transverse to the conveying direction. In this case, the covering means has a plate-like shape with a connection portion for connecting the covering means to a receiving portion of the conveying cart which extends transversely to the conveying direction. Further, the covering means has lateral convexly formed end portions that adjoin the connection portion and an engagement portion for engaging, at least in portions, under an underside of an upper run of a transverse belt of the cross-belt conveyor. The engagement portion has a cutout for preventing the engagement, at least in portions, under the underside of the upper run of the transverse belt in the region of the cutout.

One advantage of this further aspect is that, by means of the particular configuration of the covering means described, complete covering of the interspace while allowing reliable operation of the cross-belt conveyor can be achieved. In particular, the cutout may permit a desired movement of the transverse belt, for example when the conveying carts are travelling straight ahead, and may support the above-described effect of preventing an undesirable movement of the transverse belt, for example when the conveying carts are negotiating curves.

In particular, the connection portion may be formed in substantially rectilinear manner for parallel connection of the covering means to the receiving portion of the conveying cart.

For example, the lateral convexly formed end portions may adjoin the connection portion approximately at right-angles. In this case, the radius of the convexity may be selected dependent on an extent of the interspace in the conveying direction and/or dependent on a horizontal curve angle that is to be expected or is permissible. By means of the convex configuration of the lateral end portions, approximately constant covering of the interspace can be ensured even in the event of pivoting of the covering means due to negotiating curves.

In particular, the engagement portion may be formed parallel to the connection portion, i.e. transverse to the conveying direction. Thus it can be ensured that the engagement portion will rest on the supporting surface for the covering means described above, without the engagement portion unintentionally coming into contact with track rollers and/or the transverse belt of the cross-belt conveyor of the other conveying cart.

For example, a transition from the lateral end portion to the engagement portion may be formed as a set-back portion formed in the radial direction. Thus, even in the case of pivoting of the covering means, which is due to negotiating curves, approximately constant covering of the interspace can be ensured, with, in particular, a region of the interspace being able to be covered effectively on the deflecting rollers of the cross-belt conveyor of the other conveying cart.

In particular, the middle of engagement portion may have a cutout for preventing the engagement, at least in portions, under the underside of the upper run of the transverse belt in the region of the cutout. In particular, in the case of the above-described travelling straight ahead, engagement at least in portions of the covering means between the underside of the upper run and the first support plane can be prevented. For example, in the case of an above-described central track roller which is present, otherwise, i.e. without such a cutout, a desired movement of the transverse belt could be prevented.

For example, the engagement portion may have a plurality of such cutouts over its extent from the one lateral end portion to the other lateral end portion. In this case, the distances between the cutouts may be selected dependent on the axle spacings of the track rollers of the cross-belt conveyor of the other conveying cart.

In particular, when negotiating curves, a peripheral edge of the cutout, viewed from above, can pivot into a gap between two track rollers of the cross-belt conveyor and push itself onto the upper side of that one of the two track rollers that is arranged farther to the outside of the curve into a position, in particular into a braking position of at least a portion of the covering means, in which the covering means engages, at least in portions, between the underside of the upper run and the first support plane, thereby supporting the above-described effect of hindering the transverse belt from moving in the transverse conveying direction, i.e. braking the transverse belt.

Advantageously, the braking effect or the holding in position of the transverse belt can be achieved substantially on the outer deflecting rollers. As described, the peripheral edge of the cutout can engage between the underside of the upper run and the first support plane, but the braking effect in this case can be controlled only to a limited extent; this can be done better on the deflecting rollers.

The covering means may be formed at the back on the front conveying cart and the cross-belt conveyor may be formed on the rear conveying cart, or the covering means may be formed at the front on the rear conveying cart and the cross-belt conveyor on the front conveying cart.

Alternatively, the covering means may be formed at the front or at the back on the one conveying cart and the cross-belt conveyor on the same conveying cart.

For example, the covering means may be formed at the front and at the back on the one conveying cart and the cross-belt conveyor may be formed on the other conveying cart. In other words, conveying carts with covering means formed at the front and at the back and conveying carts without a covering means may alternate in the conveying device.

Advantageously, the cutout may be approximately V-shaped to guarantee that the peripheral edge of the cutout only engages between the underside of the upper run and the first support plane from a certain curve radius onward, in particular if a sufficient braking effect is already achieved on one of the deflecting rollers.

In particular, the open side of the cutout may be directed towards the central track roller of the other conveying cart.

Advantageously, an extent of the cutout in the conveying direction and/or a V-angle of the cutout can be formed dependent on a horizontal curve angle of the conveying carts relative to the conveying direction that is to be expected or is permitted.

Thus by means of dimensioning of the cutout, in particular dimensioning of the extent of the cutout in the conveying direction and/or of the V-angle, it can be established from what horizontal curve angle onwards the engagement portion on the cutout pushes itself between the central track roller and the upper run of the transverse belt.

The covering means may be formed, at least in part, from a material that is sufficiently flexible, or may be attached to the conveying cart with sufficient flexibility, or may have such a compensation means, for example a hinge or at least an articulation, that a vertical movement of one of the two conveying carts in relation to the other conveying cart and/or a difference in an angle of inclination to the horizontal in the conveying direction of the conveying device between the two conveying carts can be compensated for.

Thus when the conveying carts are negotiating curves, a portion of the covering means that engages between the underside of the upper run and the first support plane, and the first support plane can retain an approximately identical orientation, despite the vertical movement of one of the two conveying carts in relation to the other conveying cart and/or a difference in an angle of inclination to the horizontal in the conveying direction between the two conveying carts.

A vertical movement of one of the two conveying carts in relation to the other conveying cart and/or a difference in an angle of inclination to the horizontal in the conveying direction between the two conveying carts may occur for example if the conveying carts are travelling uphill or downhill.

Further, when the conveying carts are travelling straight ahead, a portion of the covering means that rests on the second support plane and the second support plane can retain an approximately identical orientation despite the vertical movement of one of the two conveying carts in relation to the other conveying cart and/or a difference in an angle of inclination to the horizontal in the conveying direction of the conveying device between the two conveying carts.

This prevents the covering means from engaging, at least in portions, in the upper run of the transverse belt or in at least one of the track rollers, and the covering means, the transverse belt and/or at least one of the track rollers thereby being damaged, as would otherwise be the case.

Below, an exemplary embodiment of the conveying device according to the invention and of the covering means according to the invention will be discussed in greater detail with reference to drawings.

BRIEF DESCRIPTION OF THE DRAWINGS

FIG. 4 is a top view of a covering means according to the exemplary embodiment in FIG. 1.

FIG. 5 is a top view of the conveying device according to FIG. 1 with two conveying carts when negotiating curves.

DETAILED DESCRIPTION

Figure 1:
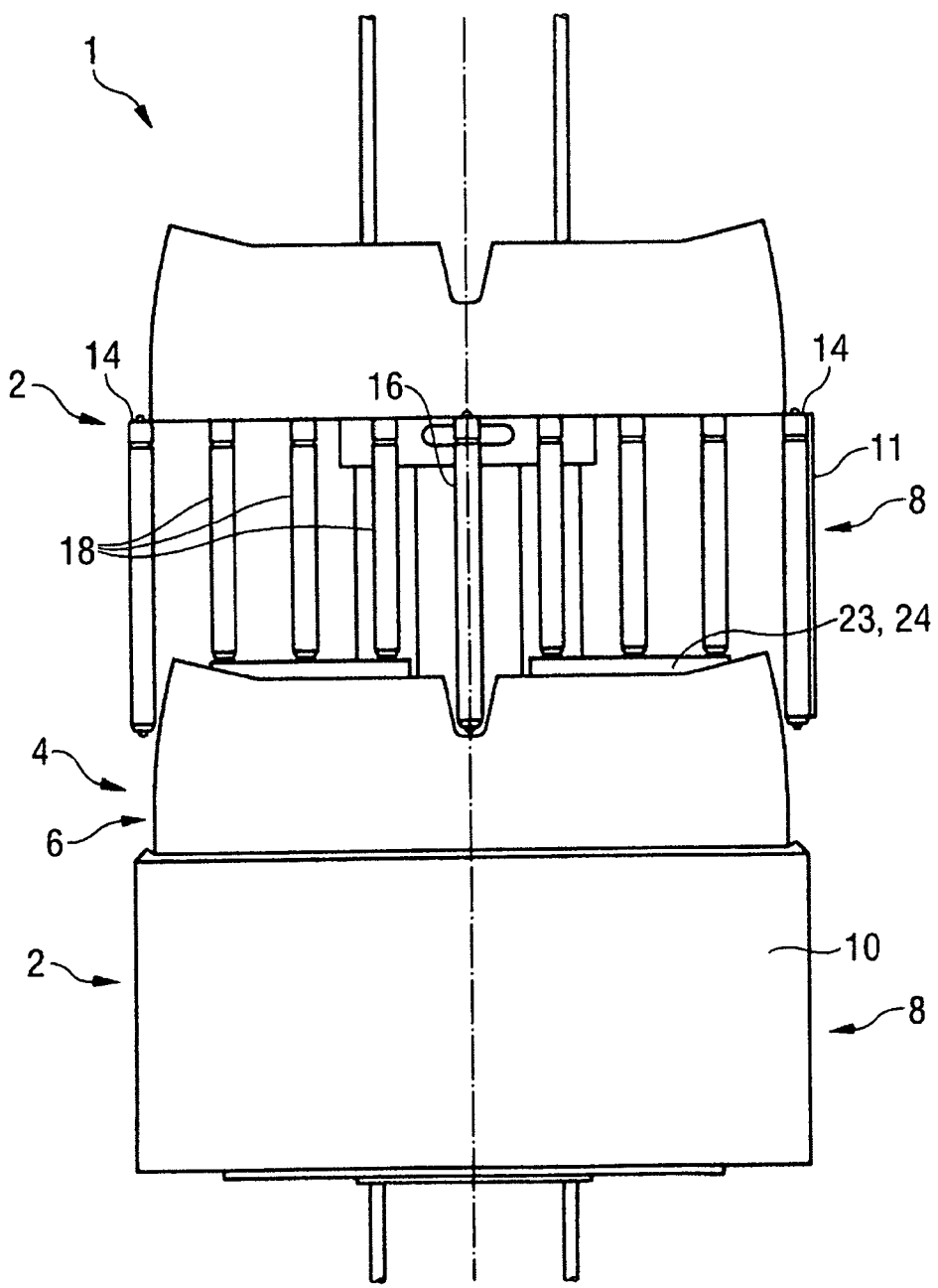
FIG. 1 is a top view of a conveying device according to the exemplary embodiment of the invention with two conveying carts travelling straight ahead.

The conveying device 1 according to the exemplary embodiment of the invention illustrated in FIG. 1 has two conveying carts 2 that are arranged one behind the other in the conveying direction and are spaced apart from each other. An interspace 4 resulting therefrom, between the conveying carts 2, is covered by the covering means 6.

In the exemplary embodiment shown, both conveying carts 2 may have a cross-belt conveyor 8 and a covering means 6 that is attached at the front in each case. Since in this exemplary embodiment both conveying carts 2 are formed identically, the detailed description below applies to both conveying carts 2 equally.

The cross-belt conveyor 8 may contain a transverse belt 10 and a plurality of rotatably mounted track rollers in a frame 11. In the exemplary embodiment illustrated, the track rollers are, in particular, deflecting rollers 14, a central track roller 16, which is mounted resiliently to form an elastic force-induced counter-surface for a friction-wheel roller, not shown, that drives the transverse belt 10, and inner track rollers 18 arranged therebetween. The transverse belt 10 has been omitted from the front conveying cart 2 for better understanding. The outermost track rollers are deflecting rollers 14, and a track roller arranged in the middle may be a central track roller 16. On either side of the central track roller 16, the track rollers may be formed as inner track rollers 18.

The deflecting rollers 14 and the central track roller 16 may have an identical axial extent, the inner track rollers 18 possibly being formed shorter in the axial direction than the deflecting rollers 14 and the central track roller 16. Since all the track rollers are arranged with their one end face on the front side of the conveying cart 2, a gap with the frame 11 is produced in the axial direction thereof rearwards. The gap may be formed with a second support plane 24, formed as a supporting surface 23, for the covering means 6.

Figure 2:
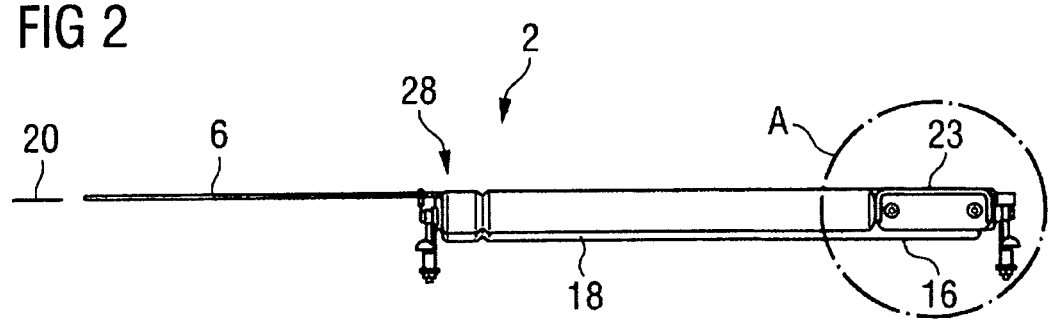
FIG. 2 is a side view of the upper part of the conveying cart without the underlying travelling gear in accordance with the exemplary embodiment in FIG. 1.

In the side view of one of the conveying carts 2 illustrated in FIG. 2, for better understanding the transverse belt 10 and the deflecting roller 14, which would otherwise be visible, have been omitted and the configuration in principle of a conveying cart 2 with a covering means 6 arranged thereon is shown.

The covering means 6 may be attached to the conveying cart 2 such that an underside of the covering means 6 either: rests, at least in portions, in the first support plane 20 when negotiating curves; or rests completely in the second support plane 24, and hence rests on the supporting surface 23 when travelling straight ahead. This is possible because the covering means 6 is formed from flexible material and moves downwards due to gravity. If therefore the covering means 6 is not held by the first support plane 20, or does not rest thereon, then the covering means 6 will, due to gravity, move in the direction of the second support plane 24 and then rest on the supporting surface 23, since the second support plane 24 and hence the surface 23 rests beneath the first support plane 20. The supporting surface 23 may be formed as a shaped sheet metal part or as a shaped plastics part, in particular with a flat or smooth supporting surface 23.

Figure 3:
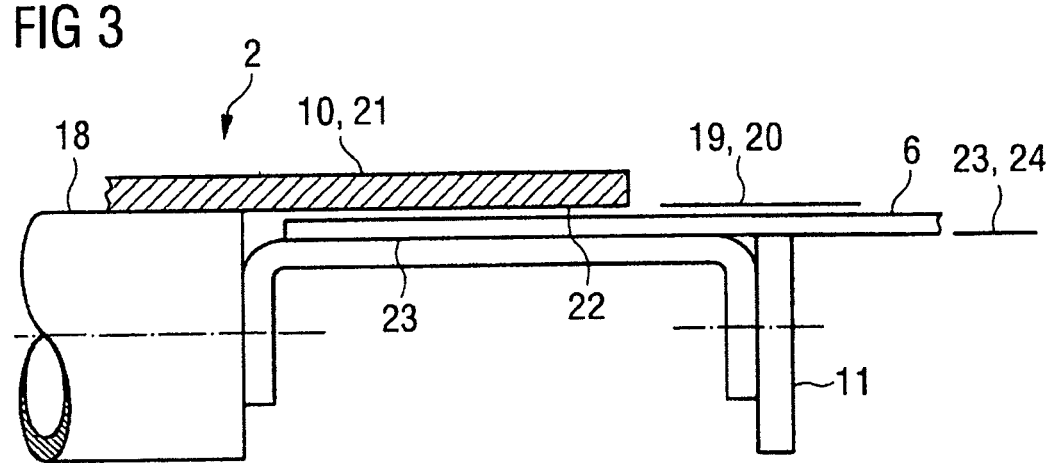
FIG. 3 is an enlarged view of detail A according to FIG. 2 when travelling straight ahead.
Figure 3A:
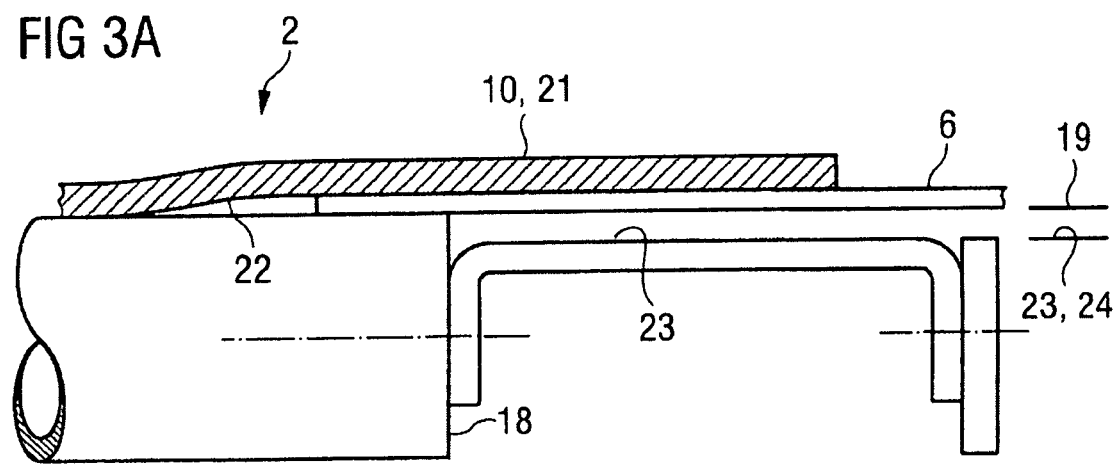
FIG. 3a is an enlarged view of detail A according to FIG. 2 when negotiating curves.

FIGS. 3 and 3a are enlarged views of detail A of FIG. 2, and in FIG. 3 and FIG. 3a, the deflecting rollers 14, the central track roller 16 and encircling edges and other details of the frame 11 have been omitted for better understanding. FIG. 3 and FIG. 3a show that the second bearing plane 24, which adjoins an inner track roller 18 and is formed as a supporting surface 23, is spaced apart perpendicularly downwards from the first support plane 20.

The uppermost barrel lines of the track rollers rest in a common conveying plane 19, which represents the first support plane 20 for an upper run 21 of the transverse belt 10.

It is shown in FIG. 3 that, when travelling straight ahead, the covering means 6 of the rear conveying cart 2 engages under the upper run 21 and hence between the first support plane 20 and the second support plane 24, in order to rest on the supporting surface 23. The thickness of the covering means 6 and the difference in height between the first support plane 20 and the second support plane 24 are selected such that the upper side of the covering means 6 does not touch the underside of the upper run 21 of the transverse belt 10, in particular if there is no conveyed material lying on it. If conveyed material is lying in the region of the second support plane 24, the upper run 21 lowers and only in this region on the covering means 6 a slide contact occurs without any influencing of the rolling friction of the upper run 21 in the region of the track rollers.

The covering means 6 of the rear conveying cart 2 may, in particular exclusively, rest on the supporting surface 23 or the second support plane 24. The transverse belt 10 in this case rests with the underside 22 of its upper run 21 on the first support plane 20.

It is shown in FIG. 3a that when negotiating curves the covering means 6 of the rear conveying cart 2 engages between the underside 22 of the upper run 21 and the first support plane 20, in that the covering means 6 pushes itself onto the upper side of the inner track roller 18 and rests thereon. Consequently, the underside of the upper run 21 is raised by the thickness of the covering means 6 and in this region rests on the upper side of the covering means 6. In this case, the covering means 6 is raised by at least the thickness of the covering means 6 and is pushed between the upper run 21 and the upper side of the inner track roller 18, and brakes the transverse belt 10. This supports the desired braking or stopping effect of the transverse belt 10 when negotiating curves.

Consequently, the covering means 6 of the rear conveying cart 2 rests at least in part on the first support plane 20 or on the upper side of the inner track roller 18. Additionally, the covering means 6 of the rear conveying cart 2 could in this case at least even partially rest on the supporting surface 23 or the second support plane 24. The transverse belt 10 rests with part of the underside 22 of its upper run 21 on the upper side of the inner track roller 18 (first support plane 20) and with another part of the underside 22 of its upper run 21 on the tray 6 of the rear conveying cart 2.

The covering means 6 shown in FIG. 4 has a plate-like shape with a connection portion 26 for connecting the covering means 6 to a receiving portion 28 of the conveying cart 2 which extends transversely to the conveying direction (see FIG. 2).

Further, the covering means 6 has lateral convexly formed end portions 30 which adjoin the connection portion 26, and an engagement portion 32 for engaging at least in portions under the underside 22 of the upper run 21.

The engagement portion 32 has a cutout 34 to prevent the engagement, at least in portions, under the underside 22 of the upper run 21 in the region of the cutout 34.

The connection portion 26 may be formed substantially rectilinearly for parallel connection of the covering means 6 to the receiving portion 28 of the conveying cart 2.

The lateral convexly formed end portions 32 may adjoin the connection portion 26 approximately at right-angles. In this case, the radius of the convexity may be selected dependent on an extent of the interspace 4 in the conveying direction and/or dependent on a horizontal curve angle 36 which is to be expected or is permissible (see FIG. 5).

The engagement portion 32 may be formed parallel to the connection portion 26, i.e. transversely to the conveying direction.

A transition 38 from the lateral end portion 30 to the engagement portion 32 may be designed as a set-back portion 39 formed in the radial direction.

The engagement portion 32 may have in the middle a cutout 40 to prevent the engagement, at least in portions, under the underside 22 of the upper run 21 of the transverse belt 10 in the region of the cutout 40.

The cutout 40 may be approximately V-shaped, with the open side of the cutout 40 possibly being directed towards the central track roller 16 of the other conveying cart 2.

Below, the functioning of the covering means during operation of the conveying device will be described with reference to the drawings.

When the conveying cart 2 is travelling straight ahead as illustrated in FIG. 1, the covering means 6 in the region of the front conveying cart 2 rests exclusively on the second support plane 24. In this case, the covering means 6 may engage between the first support plane 20 and the second support plane 24 in order to permit the movement of the transverse belt 10 in the transverse conveying direction. The above-described transition 38 from the lateral end portion 30 to the engagement portion 32, which may be formed as a set-back portion 39 in the radial direction, means that the covering means 6 does not unintentionally come into contact with track rollers and/or the transverse belt 10. In other words, the covering means 6 in this case does not engage between the underside 22 of the upper run 21 and the first support plane 20. It goes without saying here that the covering means 6 rests on the supporting surface 23.

When the conveying carts 2 are negotiating curves, as illustrated in FIG. 5, a free end portion of the covering means 6, viewed from above, can pivot on a side of the front conveying cart 2 that is internal to the curve with a peripheral edge in front into a gap between two track rollers of the cross-belt conveyor 8, namely that deflecting roller 14, which is on the inside of the curve and the inner track roller 18 adjacent thereto, and push itself onto the upper side of that one of the two track rollers that is arranged farther to the outside of the curve, namely the above-mentioned inner track roller 18. As a result, the covering means 6 is raised in this region and the sought braking-holding position is produced by at least a portion of the covering means 6. In the braking position, the covering means 6 therefore engages at least in portions between the underside 22 of the upper run 21 and the first support plane 20 in order to hinder the transverse belt 10 from moving in the transverse conveying direction, i.e. to brake or stop the transverse belt 10 when negotiating curves. A free end portion of the covering means 6 may in this case for example be one of the lateral end portions 30 of the covering means 6 or the engagement portion 32, in particular in the region of the cutout 40.

When negotiating curves, the covering means 6, on that side of the front conveying cart 2 which is external to the curve, pivots, at least in portions, in the direction out of the region of the front conveying cart 2.

As a result, alternatively or in addition to the braking or holding function of the transverse belt described above, a free end portion of the covering means 6, viewed from above, can pivot on a side of the front conveying cart 2 that is external to the curve with a peripheral edge in front in a gap between that deflecting roller 14 that is on the outside of the curve and the inner track roller 18 adjacent thereto, and in the region of the deflecting roller 14 push itself between the underside 22 of the upper run 21 and the upper side of the deflecting roller 14 and block the transverse belt 10. As a result, the covering means 6 is raised by at least the thickness of the covering means 6 in this region and the sought braking-holding position is produced by at least a portion of the covering means 6. In the braking position, the covering means 6 therefore engages at least in portions between the underside 22 of the upper run 21 and the first support plane 20 in order to hinder the transverse belt 10 from moving in the transverse conveying direction, i.e. to brake or stop the transverse belt 10 when negotiating curves. A free end portion of the covering means 6 may in this case for example be one of the lateral end portions 30 of the covering means 6, or the engagement portion 32, in particular in the region of the transition between the lateral end portion 30 of the covering means 6 and the set-back portion 39.

Nevertheless, the interspace 4 may continue to be covered completely by the covering means 6, since the transition 38 as previously described may be formed as a set-back portion 39 in the radial direction. The covering means 6 in this case protrudes on the side of the front conveying cart 2 that is external to the curve at least with the set-back portion 39 into the region of the front conveying cart 2.

The configuration of the transition 38 from the lateral end portion 30 to the engagement portion 32 as a set-back portion 39 formed in the radial direction may therefore serve to attain two aims which actually conflict: on one hand, when travelling straight ahead to prevent unintentional contact of the covering means 6 with the track rollers and/or the underside 22 of the transverse belt 10, and on the other hand when negotiating curves to completely cover the interspace 4 despite the above-described pivoting-out of the covering means 6.

The transition 38 may advantageously be of such dimensions that with a maximum horizontal curve angle 36 the transition 38 is still arranged in the region of the other conveying cart 2 under the upper run 21.

The above-described convex configuration of the lateral end portions 30 of the covering means 6 ensures that the interspace 4 is covered when negotiating curves both when pivoting-in the covering means 6 on the side of the conveying cart 2 that is internal to the curve and also when pivoting-out the covering means 6 on the side of the conveying cart 2 that is external to the curve. This applies for negotiating curves to the right or left.

What has been said in relation to the transition 38 applies analogously to the cutout 34, by means of which on one hand when travelling straight ahead unintentional contact of the covering means 6 with the central track roller 16 and/or the transverse belt 10 can be prevented and on the other hand when negotiating curves the covering means 6 can protrude at least in portions so far into the region of the front conveying cart 2 that the interspace 4 is completely covered despite the above-described pivoting-out of the covering means 6, and, as described above, an undesirable movement of the transverse belt 10 is prevented.

An extent of the cutout 34 in the conveying direction and/or an angle 42 of the cutout may advantageously be dimensioned dependent on a horizontal curve angle 36 of the conveying carts 2 relative to the conveying direction which is to be expected or is permitted.

LIST OF REFERENCE CHARACTERS 1 conveying device
2 conveying cart
4 interspace
6 covering means
8 cross-belt conveyor
10 transverse belt
11 frame
14 deflecting roller
16 central track roller
18 inner track rollers
20 first support plane
21 upper run
22 underside of the upper run
23 supporting surface
24 second support plane
26 connection portion
28 receiving portion
30 lateral end portion of the covering means
32 engagement portion
34 cutout
36 horizontal curve angle
38 transition
39 set-back portion
40 cutout
42 angle

The invention claimed is:

1. A conveying device (1) with at least first and second conveying carts (2) that are arranged one behind the other in a conveying direction and are spaced apart from each other such that an interspace (4) is formed between the first and second conveying carts (2), wherein at least the second conveying cart (2) comprises a covering means (6) and at least the first conveying cart (2) comprises a cross-belt conveyor (8) that includes a transverse belt (10) for conveying conveyed material in a transverse conveying direction oriented substantially transversely to the conveying direction, wherein the covering means (6), when the first and second conveying carts (2) are travelling straight ahead and when the first and second conveying carts (2) are negotiating curves, covers the interspace (4) between the first and second conveying carts (2) in that the covering means (6) of the second conveying cart (2) is arranged at least in portions under an upper run (21) of the transverse belt (10) of the first conveying cart (2), wherein, when negotiating curves, the covering means (6) of the second conveying cart (2) engages, at least in portions, between an underside (22) of the upper run (21) and a first support plane (20) of the first conveying cart (2) in order to hinder the transverse belt (10) of the first conveying cart (2) from moving in the transverse conveying direction, wherein when travelling straight ahead the covering means (6) of the second conveying cart (2) engages, at least in portions, between the first support plane (20) and a second support plane (24) of the first conveying cart (2) in order to permit the movement of the transverse belt (10) in the transverse conveying direction, and wherein the first support plane (20) and the second support plane (24) are spaced apart from each other.

2. The conveying device (1) of claim 1, wherein, when the first and second conveying carts (2) are negotiating curves, a free end portion of the covering means (6) of the second conveying cart (2) pivots into a gap between two track rollers of the cross-belt conveyor (8) of the first conveying cart (2) and pushes itself onto the upper side of that one of the two track rollers that is arranged farther to the outside of the curve, into a position in which the covering means (6) of the second conveying cart (2) engages between the underside (22) of the upper run (21) of the transverse belt (10) of the first conveying cart (2) and the first support plane (20) of the first conveying cart (2) in order to hinder the transverse belt (10) of the first conveying cart (2) from moving in the transverse conveying direction.

3. The conveying device (1) of claim 1, wherein when the conveying carts (2) are negotiating curves a lateral end portion (30) of the covering means (6) that is on the outside of the curve pivots into a gap between an inner track roller (18) and that deflecting roller (14) of the cross-belt conveyor (8) that is external to the curve and pushes itself onto the upper side of that deflecting roller (14) which is external to the curve, into a position in which the covering means (6) engages between the underside (22) of the upper run (21) of the transverse belt (10) of the first conveying cart (2) and the first support plane (20) of the first conveying cart (2) in order to hinder the transverse belt (10) of the first conveying cart (2) from moving in the transverse conveying direction.

4. The conveying device (1) of claim 1, wherein, when the conveying carts (2) are travelling straight ahead, the covering means (6) of the second conveying cart (2) in the region of the first conveying cart (2) rests on the second support plane (24) of the first conveying cart (2).

5. The conveying device (1) of claim 1, wherein the first support plane (20) of the first conveying cart (2) is oriented substantially parallel to the second support plane (24) of the first conveying cart (2).

6. The conveying device (1) of claim 1, wherein the first and the second support plane (24) of the first conveying cart (2) are spaced apart from each other approximately perpendicularly to their direction of extent.

7. The conveying device (1) of claim 1, wherein the first support plane (20) of the first conveying cart (2) is formed as a conveying plane (19) defined, in each case, by an uppermost barrel line of the track rollers of the cross-belt conveyor (8) of the first conveying cart (2), and the second support plane (24) is formed as a supporting surface (23) that adjoins inner track rollers (18) of the cross-belt conveyor (8) in an axial direction thereof, and wherein the inner track rollers (18) are formed between deflecting rollers (14) of the cross-belt conveyor (8).

8. The conveying device (1) of claim 7, wherein the inner track rollers (18) and the supporting surface (23) of the first conveying cart (2), viewed in the axial direction of the track rollers, together have an extent of approximately the same size as the axial extent of the deflecting rollers (14).

9. The conveying device (1) of claim 7, further comprising a central track roller (16) arranged between the deflecting rollers (14) of the cross-belt conveyor (8), the central track roller (16) having an axial extent that corresponds to that axial extents of the deflecting rollers (14), and wherein the inner track rollers (18) are formed on both sides of the central track roller (16).

10. The conveying device (1) of claim 1, wherein the first and second conveying carts (2) are substantially identical.

11. A covering means (6) for covering an interspace (4) between first and second conveying carts (2) of a conveying device (1) that are arranged one behind the other in a conveying direction and are spaced apart from each other, wherein at least the second conveying cart (2) has the covering means (6) and at least the first conveying cart (2) has a cross-belt conveyor (8) with a transverse belt (10) for conveying conveyed material in a transverse conveying direction oriented substantially transversely to the conveying direction, and wherein the covering means (6) has a plate-like shape with
a connection portion (26) for connecting the covering means (6) to a receiving portion of the first conveying cart (2), the connection portion (26) extending transversely to the conveying direction,
lateral convexly formed end portions (30) that adjoin the connection portion (26), and
an engagement portion (32) for engaging, at least in portions, under an underside (22) of an upper run (21) of a transverse belt (10) of the cross-belt conveyor (8),
wherein the engagement portion (32) comprises a cutout (34) for preventing the engagement, at least in portions, under the underside (22) of the upper run (21) of the transverse belt (10) in a region of the cutout (34).

12. The covering means (6) of claim 11, wherein the cutout (34) is approximately V shaped.

* * * * *